United States Patent
Espinoza et al.

(10) Patent No.: US 6,929,754 B2
(45) Date of Patent: Aug. 16, 2005

(54) SOLID/LIQUID SEPARATION SYSTEM FOR MULTIPHASE CONVERTERS

(75) Inventors: Rafael L. Espinoza, Ponca City, OK (US); Sergio R. Mohedas, Ponca City, OK (US); Doug S. Jack, Ponca City, OK (US); Oluwaseyi A. Odueyungbo, Ponca City, OK (US); James Dale Ortego, Jr., Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 191 days.

(21) Appl. No.: 10/414,636

(22) Filed: Apr. 16, 2003

(65) Prior Publication Data

US 2005/0027021 A1 Feb. 3, 2005

Related U.S. Application Data

(60) Provisional application No. 60/372,961, filed on Apr. 16, 2002.

(51) Int. Cl.[7] .......................... B01D 37/02; B01D 37/04
(52) U.S. Cl. ...................... 210/777; 210/791; 210/193
(58) Field of Search .............................. 210/777, 778, 210/791, 193

(56) References Cited

U.S. PATENT DOCUMENTS

| | | | |
|---|---|---|---|
| 4,530,764 A | 7/1985 | Thomas et al. | ............. 210/637 |
| 4,605,678 A | 8/1986 | Brennan et al. | ............. 518/700 |
| 5,407,644 A | 4/1995 | Rytter et al. | ................ 422/147 |

(Continued)

FOREIGN PATENT DOCUMENTS

| | | | |
|---|---|---|---|
| JP | 08-99021 A | 4/1996 | |
| WO | WO 99/64380 | 12/1999 | ............. C07C/1/04 |
| WO | WO 03/004582 | 1/2003 | ............ C10G/2/00 |

OTHER PUBLICATIONS

PCT International Search Report Dated Apr. 26, 2004 for Appln. No. PCt/US03/11544 (4 p.).

[online]: Retrieved from the Internet on Mar. 26, 2003:<URL: http://www.pall.com/applicat/hcp/back-wash.asp ; Pall Backwash Systems; (pp. 3)r.

(Continued)

*Primary Examiner*—Fred G. Prince
(74) *Attorney, Agent, or Firm*—Conley Rose P.C.

(57) ABSTRACT

Methods and apparatus for removing wax products from a slurry used in a Fischer-Tropsch reactor. The preferred embodiments of the present invention are characterized by a solid/liquid separation system that removes liquid products from a slurry by drawing the fluid across a filter medium composed of a filter cake disposed on a substrate. In the preferred embodiments, the filter cake is desirable and performs the majority of the filtration. In certain embodiments, the filter medium is disposed in a filter housing where slurry flows parallel to the longitudinal axis of the filter medium from and inlet to an outlet. The characteristics or properties of the cake, which will effect the performance of the solid/liquid separation system, can be controlled by regulating the velocity of the slurry flowing across the cake, where the velocity may be regulated by adjusting the slurry flow through the filter housing or may be self-regulated by changing slurry velocities influenced by the design of the filter housing.

65 Claims, 4 Drawing Sheets

U.S. PATENT DOCUMENTS

| | | | | |
|---|---|---|---|---|
| 5,422,375 | A | 6/1995 | Rytter et al. | 518/700 |
| 5,520,890 | A | 5/1996 | Lorentzen et al. | 422/197 |
| 5,527,473 | A | 6/1996 | Ackerman | 210/767 |
| 5,770,629 | A | 6/1998 | Degeorge et al. | 518/700 |
| 5,811,469 | A | 9/1998 | Leviness et al. | 518/700 |
| 5,827,903 | A | 10/1998 | White et al. | 518/710 |
| 5,844,006 | A | 12/1998 | Jager et al. | 518/700 |
| 5,900,159 | A | 5/1999 | Engel et al. | 210/788 |
| 5,919,721 | A | 7/1999 | Potter | 502/64 |
| 5,962,537 | A | 10/1999 | Leviness | 518/700 |
| 6,068,760 | A | 5/2000 | Benham et al. | 208/950 |
| 6,069,179 | A | 5/2000 | Rytter et al. | 518/700 |
| 6,096,789 | A | 8/2000 | Clerici et al. | 518/706 |
| 6,217,830 | B1 | 4/2001 | Roberts et al. | 422/140 |
| 6,344,490 | B1 | 2/2002 | DeGeorge et al. | 518/700 |
| 6,833,078 | B2 * | 12/2004 | Espinoza et al. | 210/800 |

OTHER PUBLICATIONS

[online]: Retrieved from the Internet on Mar. 26, 2003:<URL: http://domino.pall.com/www/pi+catalog.nsf/AB76IEE7F8FEB25A852564730010BD3C/7DA099.. *Pall Backwash Filtration Systems;* (pp. 3).

Pall Life Sciences; *Pall Backwash Filtration Systems;* (undated); (pp. 2).

Bechtel Corporation: *Alternative Fuel and Chemicals from Synthesis Gas;* Prepared for Air Products and Chemicals; Inc.; Subcontract No. PT5781–B; May 1996 (pp. i–A5–3).

R. L. Espinoza, et al; *Use of Membranes in Fischer–Tropsch Reactors;* Studies in Surface Science and Catalysis 130; 2000 Elsevier Science B.V.; (pp. 389–294).

Mott Corporation Process Systems; *Unique Porous Media. Process Filtration Expertise. Limitless Possibilities;* (undated); (pp. 12).

[online]: Retrieved from the Internet on Mar. 26, 2003:<URL: http://domino.pal.com/www/ih%20catalog.ps [/89c31b38ff78fe]c852566d40033209e/3b3096bad . . . *Backwash Filtration Systems;* (3 pp.).

* cited by examiner

SOLID/LIQUID SEPARATION SYSTEM FOR MULTIPHASE CONVERTERS

CROSS-REFERENCE TO RELATED APPLICATIONS

The present application claims the benefit of 35 U.S.C. 111(b) Provisional Application Ser. No. 60/372,961 filed Apr. 16, 2002, and entitled "Solid/liquid Separation System for Multiphase Converters."

STATEMENT REGARDING FEDERALLY SPONSORED RESEARCH OR DEVELOPMENT

Not applicable.

TECHNICAL FIELD OF THE INVENTION

The present invention relates generally to methods and apparatus for removing liquid/wax products from a slurry used in a Fischer-Tropsch reactor. Particularly this invention relates to a method of operation of a filtration system with greater filtration fluxes, better filtrate quality, and longer filtration cycle times. The filtration system uses a cake as a filter, and the thickness of the cake is self-regulating by adjustment in slurry velocity within desired ranges, while maintaining desirable pressure differential.

BACKGROUND OF THE INVENTION

A Fischer-Tropsch reaction generally entails contacting a stream of synthesis gas with a catalyst under temperature and pressure conditions that allow the synthesis gas to react and form hydrocarbons. More specifically, the Fischer-Tropsch reaction is the catalytic hydrogenation of carbon monoxide to produce any of a variety of products ranging from methane to higher hydrocarbons and aliphatic alcohols. Research continues on the development of more efficient Fischer-Tropsch catalyst systems and reaction systems that increase the selectivity for high-value hydrocarbons in the Fischer-Tropsch product stream.

Originally, the Fischer-Tropsch synthesis was operated in packed bed reactors. These reactors have several drawbacks, such as temperature control, that can be overcome by gas-agitated slurry reactors or slurry bubble column reactors. Gas-agitated reactors, sometimes called "slurry reactors" or "slurry bubble columns," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. As the gaseous products are formed, they enter the gas bubbles and are collected at the top of the reactor.

Because of the formation of liquid products (commonly called waxes), the slurry needs to be maintained at a constant level by continuously or intermittently removing wax from the reactor. The problem with wax removal is that catalyst in the wax must be separated from the slurry and returned to the reactor to maintain a constant inventory of catalyst in the reactor. Several means have been proposed for separating the catalyst from the wax, e.g., centrifuges, sintered metal filters, cross-flow filters, woven-wire mesh, magnetic separators, gravitational settling, etc.

The separation task is most challenging when the catalyst particles break down during operation to produce "fines" which could be as small as sub-micron in size. Independent of the catalyst-wax separation systems being used (i.e. centrifugation, settling, filtration, hydrocyclones, or magnetic separation), the presence of ultra-fine particles decreases the efficiency of the separation system.

Some of the early work on catalyst/wax separation by placing filter on an external slurry circulation loop is described in an article by M. D. Schlesinger, J. H. Crowell, Max Leva and H. H. Storch titled "Fischer-Tropsch Synthesis in Slurry Phase" from the U.S. Bureau of Mines (Engineering and Process Development, Vol. 43, No. 6, page 1474 to 1479, June 1951).

When a cake is allowed to form on a substrate, its continuous growth will result in a lower filtrate flux unless continuous backwash cycles are performed, therefore lowering the overall efficiency of the filtration system. To partially overcome this limitation the separation systems are over designed in order to account for this loss of efficiency. Thus, there remains a need in the art for methods and apparatus to improve the removal of wax products from a slurry with a high solids content, such as a Fischer-Tropsch slurry. Therefore, the embodiments of the present invention are directed to methods and apparatus for filtering a slurry that seek to overcome these and other limitations of the prior art.

SUMMARY OF THE PREFERRED EMBODIMENTS

Accordingly, there is provided herein methods and apparatus for removing wax products from a slurry used in a Fischer-Tropsch reactor. The preferred embodiments of the present invention are characterized by a solid/liquid separation system that continuously removes liquid products from a slurry by drawing the fluid across a filter medium composed of a filter cake disposed on a substrate. In the preferred embodiments, the filter cake is desirable and performs the substantial majority of the filtration. In certain embodiments, the filter medium is disposed in a filter housing where slurry flows parallel to the longitudinal axis of the filter medium from and inlet to an outlet. The characteristics or properties of the cake, which will effect the performance of the solid/liquid separation system, can be controlled by regulating the velocity of the slurry flowing across the cake, where the velocity may be regulated by adjusting the slurry flow through the filter housing or may be self-regulated by changing slurry velocities influenced by the design of the filter housing, the circulation loop, or the reactor operating parameters.

On embodiment includes a method for operating a filtration system by providing a filtration housing comprising a slurry chamber and a filtrate chamber separated by a filter medium, wherein the filter medium comprises a filter cake disposed on a substrate, wherein the filter cake has a thickness and provides a substantial majority of the filtration activity. A slurry, comprising a liquid phase and a solid phase, is passed at a slurry linear velocity through the slurry chamber. A pressure differential is applied between the slurry chamber and the filtrate chamber in order to permeate a portion of the liquid phase of the slurry through the filter medium, wherein the filter medium's filtrate flux is at least partially dependent on the thickness of the filter cake. The slurry linear velocity can then be regulated to control the thickness of the filter cake.

Another embodiment includes a method for operating a filtration system by providing a filtration housing comprising a slurry chamber and a filtrate chamber separated by a substrate. A slurry, comprising a liquid phase and a solid phase, is passed through the slurry chamber at a slurry linear velocity and a pressure differential is applied between the slurry chamber and the filtrate chamber so as to form a filter cake, which comprises a portion of the slurry solid phase disposed on the substrate. A portion of the slurry liquid phase is permeated through the filter cake and the substrate to generate a filtrate flux. The filter cake performs the majority of the filtration activity such that the filtrate flux is substantially dependent on one or more filter cake properties and independent of the substrate morphology. The slurry linear velocity through the slurry chamber is regulated to control at least one filter cake property, which may be thickness or permeability.

Another embodiment includes a method for operating a filtration system by a) providing a filtration housing comprising a slurry chamber, a substrate and a filtrate chamber; b) feeding a slurry comprising predominantly a liquid phase and a solid phase to the slurry chamber at a slurry linear velocity; c) applying a differential pressure between the slurry chamber and the filtrate chamber to form a cake disposed on the substrate, wherein the cake at least partially comprises particles from the slurry solid phase disposed on the substrate and wherein the cake performs the substantial majority of the filtration activity; d) permeating a portion of the slurry liquid phase through the cake and the substrate to generate a filtrate flux that is substantially independent of the substrate morphology; and e) intermittently ceasing at least steps c and d in order to remove at least a portion of the cake from the substrate and then resuming c and d. In certain embodiments step b may also be intermittently ceased in conjunction with steps c and d.

The filtration method according to the preferred embodiments is different than a method known as cross-flow filtration, where a cake is not needed, and furthermore is avoided or 'barely' tolerated. Moreover, the resulting filtrate fluxes are much higher than the fluxes associated with cross-flow filtration, thereby making it more efficient in product recovery and more cost effective. This filtration method is also different from a method known as dead-end filtration, where the operation is not continuous and is not well suited for Fischer-Tropsch applications. Another key feature of the preferred embodiments is that the slurry flows into and out of the slurry chamber while a fraction of the liquid in the slurry is withdrawn as filtrate, such that the filtration system can operate in a continuous, as opposed to batch flow, mode.

The flow of the slurry and the filtrate may be in either the same direction or in opposite directions. The substrate is preferably a cylindrical body having its central axis aligned in parallel with the flow through the slurry chamber. The flow rate of slurry through the slurry chamber is such that the slurry linear velocity is maintained preferably between 0.1 and 4.0 feet/second. As used herein, the slurry linear velocity sometimes refer as slurry velocity, is calculated by the ratio of the slurry volumetric flow rate to the cross-sectional area of the slurry chamber available for slurry flow before forming the cake. The substrate is preferably a cylindrical filter element having a central axis parallel to the direction of slurry flow. As the filter cake thickness increases, the flow area through the slurry chamber decreases, causing a corresponding increase in the velocity of the slurry. This increased slurry velocity will erode the filter cake, decreasing the cake thickness. Therefore, the velocity of the slurry through the slurry chamber can be used to control the thickness of the filter cake. A slurry velocity greater than 5 feet/second through the slurry chamber will result in a loss of cake, cake stability, and filtrate quality.

A preferable separation system provides for at least 0.2 gallons per minute per square foot of substrate area and as much as 2 gallons per minute per square foot, or more. In the present invention, the amount of filtrate per unit time and per unit of substrate area is refer also as flux. The slurry exiting the separation system through the outlet has between 1 and 30%, and preferably between 2 and 10%, less liquid content than the slurry entering the system. In some other embodiments, the slurry exiting the separation system through the outlet has between 3 and 10% less liquid content than the slurry entering the system. The production and efficiency of the separation system can be controlled by varying the flow rate of slurry through the system and the differential pressure between the slurry chamber and the filtrate chamber.

In another embodiment, a separation system includes parallel separation units. Individual separation units can be taken off-line to be cleaned or maintained while filtration is continued with the other units.

Thus, the present invention comprises a combination of features and advantages that enable it to substantially increase efficiency of removing liquid products from a slurry having a high solids concentration. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 2:
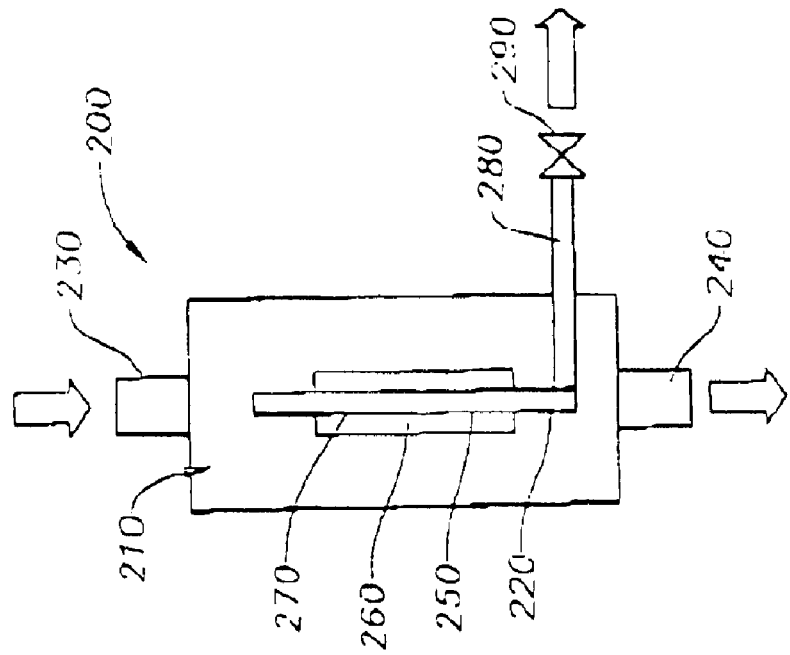
FIG. 2 is a schematic view of another embodiment of filtration system having a single filter element.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for removing liquid wax products from a slurry having a heavy solids content. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different methods and apparatus for removing wax products from a slurry. It should be understood that, while reference may be made to particular substrates, any permeable or porous substrate may be used. Suitable substrate materials may include sintered woven wire-mesh, sintered powder metal, wedge wire, porous metal fiber, and metal supported membranes. It is to be fully recognized that the different teachings of the embodiments discussed below may be employed separately or in any suitable combination to produce desired results.

As used herein, the number average particle size, $D_{avg}$, is defined by Equation (1) to be the summation over the total number of particles, of the relative frequency of particles of size i, $f_i$, times the diameter of particles of size i, $d_i$.

$$D_{avg} \equiv \sum_{i=1}^{N} f_i d_i \qquad (1)$$

The relative frequency of particles of size i, $f_i$, is determined in Equation (2) by dividing the number of particles of size i, $n_i$, by the total number of particles, N.

$$f_i \equiv \frac{n_i}{N} \qquad (2)$$

Figure 1:
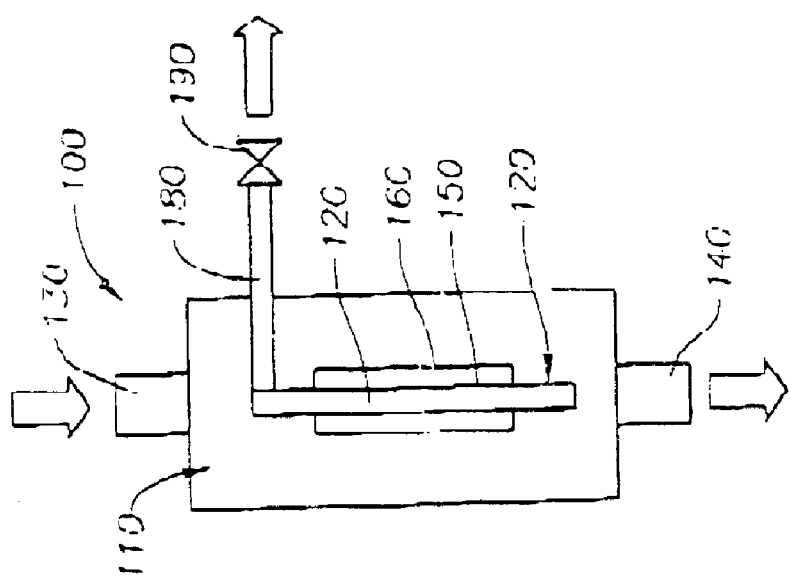
FIG. 1 is a schematic view of one embodiment of a filtration system having a single filter element.

FIG. 1 shows a schematic representation of a solid/liquid separation system 100 having a slurry chamber 110 and a filtrate chamber 120. Slurry chamber 110 has inlet 130 and outlet 140. Filtrate chamber 120 is disposed within slurry chamber 110 and at least a portion of chamber 120 is constructed of filter medium 150. Filter medium 150 includes filter cake 160 formed on substrate 170. Filtrate chamber 120 also has filtrate outlet 180, the flow through which is controlled by valve 190. Filtrate in filtrate chamber 120 flows in the opposite direction of the flow of slurry through slurry chamber 110.

Substrate 170 is a permeable membrane. The size of the membrane openings, also known as the nominal rating, may vary from sub-micron to several hundred microns. Substrate 170 is preferably a hollow, cylindrical body having a central axis aligned with the flow of slurry through slurry chamber 110. For one preferred cylindrical substrate, the aspect ratio, i.e. the length of the element divided by its diameter, is greater than 5.

Slurry enters slurry chamber 110 through inlet 130, flows tangentially past filter medium 150, and exits through outlet 140. Filter medium 150 at least partially surrounds filtrate chamber 120, which is in fluid communication with filtrate outlet 180. Slurry flows through slurry chamber 110 preferably at a flow velocity equivalent to less than 5.0 feet/second. A differential pressure is established between slurry chamber 110 and filtrate chamber 120 in order to produce flow across filter medium 150. The differential pressure is preferably maintained at a level less than 30 psi, but may also be maintained below 15 psi and even below 5 psi, while still providing acceptable filtrate flux rates. The preferred flow rate allows filter cake 160 to form on the outside surface of substrate 170.

Filter cake 160 is formed as particles that don't pass through substrate 170 build up on the outer surface of the substrate. As cake 160 builds up, the permeability of the cake will be less than the permeability of substrate 170. Without the cake 160, particles smaller in size than the nominal rating of the substrate 170 would tend to pass through the substrate. Thus, the filter cake 160 prevents these small particles from passing through the substrate 170 and performs the majority of the filtration activity of the filter medium 150. In this condition, filter cake 160 acts as the primary filtration mechanism in removing solid particles from the slurry.

The permeability and efficiency of filter cake 160 is dependent on the thickness and the solids characteristics. If cake 160 is not thick enough, small particles will permeate through cake 160 and substrate 170 into filtrate chamber 120. If cake 160 is too thick, then the filtrate flow, or flux, into filtrate chamber 120 may be restricted below desired levels. Therefore, maintaining the thickness of filter cake 160 within an optimum range is desired.

The velocity of slurry may be used to control the thickness of filter cake 160. As the thickness of filter cake 160 increases, the flow area through slurry chamber 110 decreases. Because the overall flow rate of slurry is maintained, the instantaneous velocity of the slurry past the thickened filter cake 160 must increase. This increased fluid velocity creates a shear stress on cake 160 that will erode the cake and decrease the thickness. As the thickness of cake 160 decreases the instantaneous velocity of the slurry will decrease and the thickness of the cake will stabilize.

As the cake builds up, the increasing slurry velocity over the filter cake acts as a self-regulating system. In other words, it is possible to design a slurry chamber and substrate such that as the cake builds up, the slurry velocity will increase and reduce the thickness of the cake. The system will essentially be self-regulating and capable of performing for an extended period of time. The particular dimensions of a self-regulating system will depend on the filtration performance desired as well as the properties of the slurry being filtered.

The velocity of the slurry across filter cake 160 is preferably maintained between 0.1 feet/second and 4.0 feet/second in order to maintain a preferred filter cake 160. An instantaneous velocity of the slurry exceeding 5.0 feet/second may result in a loss of thickness of filter cake 160.

FIG. 2 shows a schematic representation of a solid/liquid separation system 200 having a slurry chamber 210 and a filtrate chamber 220. Slurry chamber 210 has inlet 230 and outlet 240. Filtrate chamber 220 is disposed within slurry chamber 210 and at least a portion of chamber 220 is constructed of filter medium 250. Filter medium 250 includes filter cake 260 formed on substrate 270. Filtrate chamber 220 also has filtrate outlet 280, the flow through which is controlled by valve 290. Filtrate in filtrate chamber 220 flows in the same direction as the flow of slurry through slurry chamber 210.

Regardless of the general configuration of a solid/liquid separation system constructed in accordance with the current invention, it is understood that the specific design of the system is dependant on the characteristics of the slurry to be processed. The parameters of a separation system that may be varied for a particular slurry composition include, but are not limited to, the permeability of the substrate, the flow rate of slurry through the system, the size of the slurry chamber and the filtrate chamber, the pressure drop across the filter medium, and the flow rate of filtrate out of the system.

Figure 3:
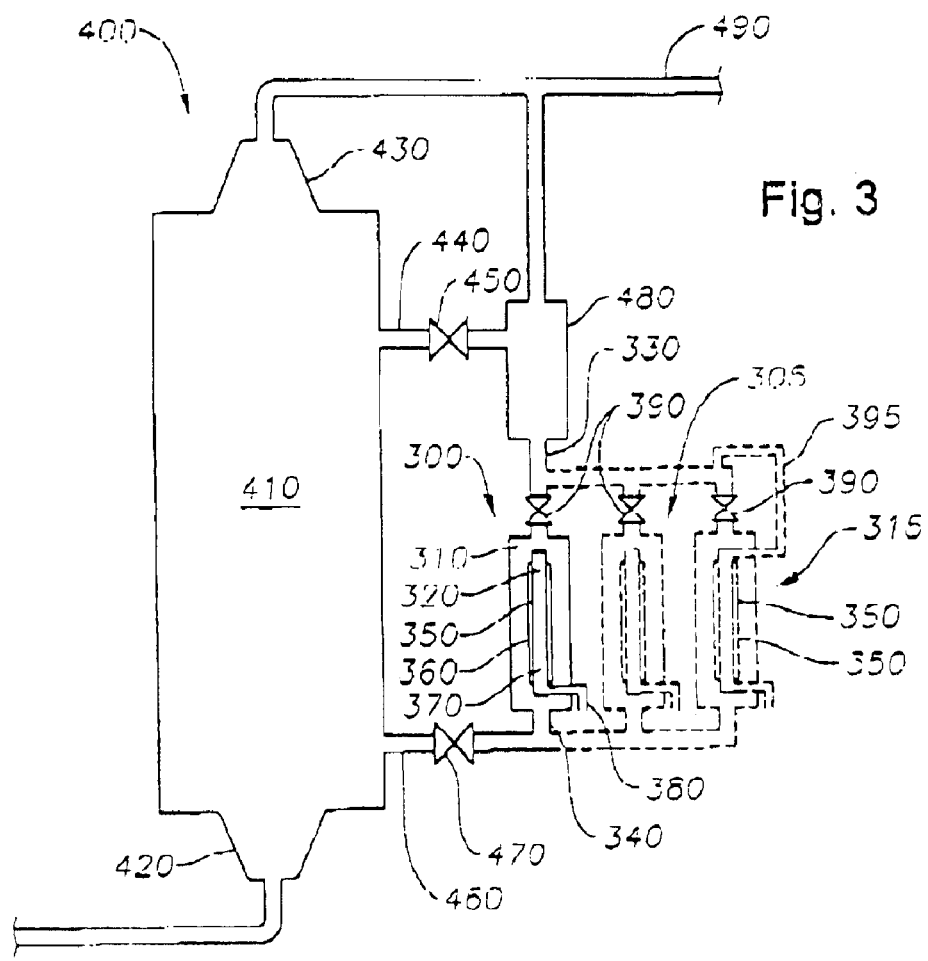
FIG. 3 is a schematic view of a reactor equipped with a filtration system.

Referring now to FIG. 3, for the purpose of discussion only, and by way of an example, the operation of solid/liquid separation system 300 will be described as a component of Fischer-Tropsch reactor system 400. Reactor system 400 includes reactor vessel 410 which has a gas inlet 420, gas outlet 430, slurry inlet 460, and slurry outlet 440. Valves 450 and 470, respectively, control the flow of slurry out of and into vessel 410. System 400 also includes degassing unit 480, gas outlet 490, and solid/liquid separation system 300. System 400 may also optionally include additional separation systems 305 and 315.

FIG. 3 shows a schematic representation of a solid/liquid separation system 300 having a slurry chamber 310 and a filtrate chamber 320. Slurry chamber 310 has inlet 330 and outlet 340. Filtrate chamber 320 is disposed within slurry chamber 310 and at least a portion of chamber 320 is constructed of filter medium 350. Filter medium 350 includes filter cake 360 formed on substrate 370. Filtrate chamber 320 also has filtrate outlet 380, the flow through which is controlled by a valve (not shown).

Syngas, containing hydrogen and carbon monoxide, is fed through inlet 420 into reactor vessel 410, which contains a solid catalyst suspended in a slurry. The catalyst may preferably include cobalt, ruthenium, or iron on a support of alumina, silica, titania, zirconia, or combinations thereof. As the syngas travels through reactor 410, the reactants (hydrogen and carbon monoxide) are absorbed into the slurry and diffuse to the catalyst where they are converted to gaseous and liquid (wax) products. The gaseous products are removed from reactor 410 through outlet 430. The wax products mix with the slurry. An exemplary reactor system is described in U.S. patent application Ser. No. 10/023,258, titled "Slurry Bed Reactor Operated in Well-Mixed Gas Flow Regime," the entirety of which is hereby incorporated by reference herein for all purposes.

A fraction of the particles making up the solid phase of the slurry may have a size smaller than the nominal rating of the substrate. In one preferred embodiment, the solid catalyst suspended in the slurry has a particle size distribution between 1 and 250 um. In one preferable slurry, 95 weight percent of the catalyst particles are between 10 and 200 um with a number average particle size between 20 and 50 um. The solid particles form between 5 and 25 volume percent of the slurry.

Slurry leaves reactor 410 through outlet 440 and enters degassing unit 480 where residual gas is removed through outlet 490. The slurry flow into or out of reactor 410 may be gravity driven or controlled by a pump. The degassed slurry then enters separation system 300 through inlet 330. As the slurry flows through slurry chamber 310 a pressure differential across filter medium 350 causes a portion of the liquid products contained in the slurry to permeate into filtrate chamber 320. The filtrate entering filtrate chamber 320 is substantially free of solid catalyst particles and is removed through outlet 380. The remainder of the slurry, which now contains approximately 1 to 30% less liquid, is recycled back into reactor 410 through outlet 340 and inlet 460.

As previously discussed, the flow of filtrate through slurry chamber 310 can be regulated to adjust the flow rate of slurry over the filter medium 350. This flow rate can be adjusted by opening one or more of valves 390 to increase the flow of slurry to an individual slurry chamber, by adjusting the flow through valve 450 or 470 to control the flow to the entire filtration system, by adding a supplemental liquid stream (not shown) to mix with slurry entering the chamber 310, or by recycling a portion of the filtrate through a recycle line 395, with the help of a pump (not shown), to mix with slurry entering the chamber 310. The supplemental liquid stream preferably would contain compounds compatible with the overall process, for example a stream comprising naphtha, diesel range hydrocarbons, hydrocarbons such as found in the filtrate stream 380 that will remain liquid at reactor conditions, or combinations thereof.

The slurry velocity may also be controlled by the design of the solid/liquid separation system 300 and by the slurry circulation loop that circulates slurry to and from the FT reactor. The slurry velocity may be also be varied by means of a slurry pump, not shown. Other methods and apparatus for operating and regulating a solid/liquid separation system are discussed in concurrently filed patent application with Ser. No. 10/417,307, titled "Improved Solid/liquid Separation System for Multiphase Converters, (Attorney Docket No. 1856-34900), published as US Pat. Appl. No. 2003/0232894 and now issued as U.S. Pat. No. 6,887,390, the entirety of which is hereby incorporated by reference herein for all purposes.

A filtration system to support a commercial Fischer-Tropsch reactor would preferably comprise a plurality of individual filtration assemblies constructed in accordance with the described embodiments. The flow of slurry from the reactor can then be divided among the plurality of filtration assemblies so that the quality of the slurry in the reactor can be continuously maintained. Having a plurality of filtration assemblies also allows individual assemblies to be taken off line periodically so that the filter media can be cleaned or replaced as required. Each individual filtration assembly may contain one or more filter media 350, which may be constructed of different materials.

EXAMPLES

Figure 4:
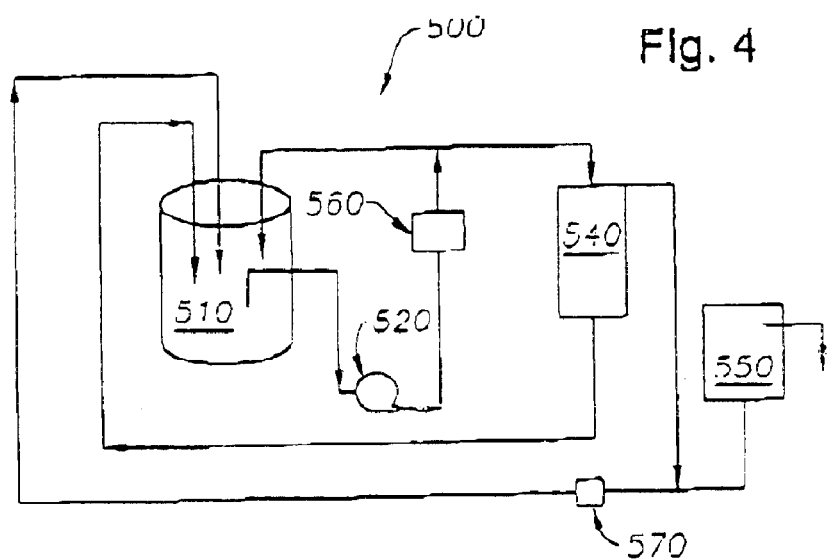
FIG. 4 is a schematic view of a laboratory setup used to test a filtration system designed in accordance with this invention.

Experiments were conducted using the laboratory setup 500 described in FIG. 4. A slurry was formed in a slurry mixing tank 510. The slurry was a mixture of liquid n-decane and solid particles of a cobalt-based catalyst. The solid concentration in the slurry was approximately 24% by weight (or about 10% by volume). At least 95% by weight of the catalyst particles, when the catalyst was fresh and first loaded in the slurry mixing tank 510, were in the range from 25 to 150 microns particle diameter. An agitator (not shown) placed inside slurry mixing tank 510 was used to maintain the solids suspended in the slurry. A slurry pump 520 sent a portion of the slurry from slurry mixing tank 510 either back to the slurry mixing tank 510 or to a filtration housing 540. A valve (not shown) was used to direct the slurry flow to the appropriate location.

The filtration housing 540 includes a substrate inside. Various substrates were used and each had a 1" outer diameter, was 20 inch long, and comprised a porous metal membrane with average openings, i.e. a nominal ratings, of approximately 20 microns. The substrate was placed concentrically in the filter housing made from a pipe of 1.94" internal diameter. The filtrate and the slurry exiting the filtration housing 540 were recycled to slurry mixing tank 510. At times, all of the filtrate coming from the filtration housing 540 was routed to storage tank 550 which could be used for backwashing purpose. A valve (not shown) was used to direct the filtrate flow to either to the slurry mixing tank 510 or to storage tank 550. Flow meters such as those represented by labels 560 and 570 were used to measure the slurry and filtrate flow rates respectively. The experiments were performed at a room temperature of approximately 70° F. (ca. 21° C.).

Example 1

Figure 5:
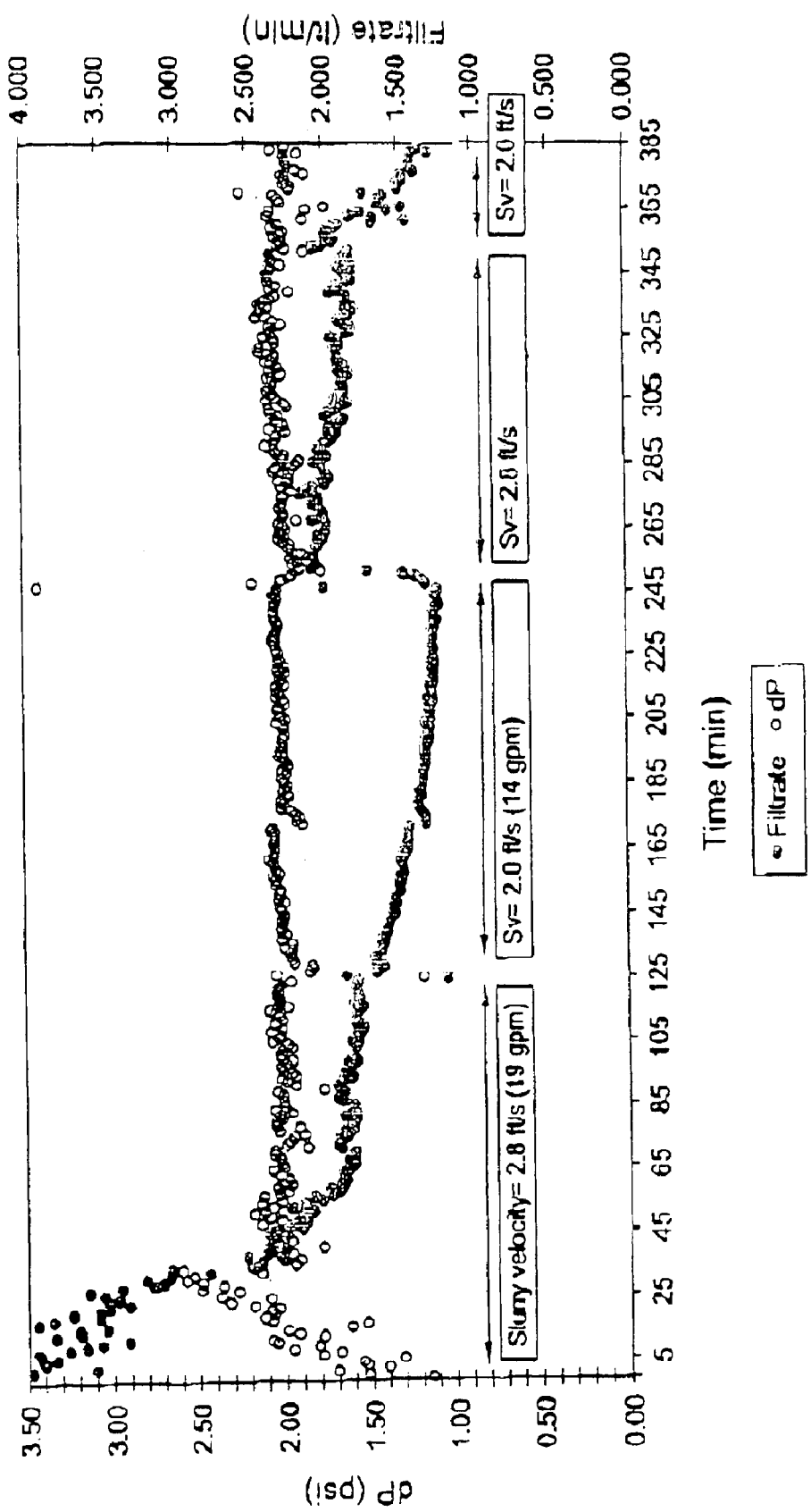
FIG. 5 is a graph representing the effect of slurry velocity on filtrate flow rate at a constant pressure differential of 2 psi between the slurry and the filtrate chambers.

In FIG. 5, the slurry flow in the filter housing for this particular example was cycled at two different rates: 19 and 14 gallons per minute (gpm), which is equivalent to a slurry linear velocity in the filter housing about of 2.8 and 2 ft/s respectively. The pressure differential across the filter medium was kept approximately constant at 2 psi by modifying the filtrate flow rate. FIG. 5 shows the effect of the slurry velocity on the filtrate flow across the filter medium. Different slurry velocities typically form cakes of different thickness around the substrate at the same pressure differential across the filter medium; therefore these different cakes exhibit different characteristics like thickness and permeability, which lead to different filtrate flows across the filter medium.

Thus, in the example of FIG. 5 for instance, the filtrate flow rate had a tendency to stabilize between 1.75 to 2.00 L/min (0.46–0.53 gpm) at a slurry velocity in the housing of 2.8 ft/s; and at a slurry velocity of 2.0 ft/s the filtrate flow is between 1.2 to 1.5 L/min (0.31–0.40 gpm). When the slurry flow rate was decreased from 19 gpm to 14 gpm, and then returned to 19 gpm, the filtrate flux returned to the same stabilized values obtained initially at 19 gpm. Similarly when the slurry flow rate was increased from 14 gpm to 19 gpm, and then returned to 14 gpm, the filtrate flux returned to the same values obtained initially at 14 gpm. This example shows that the cake characteristics can be controlled in order to produce desired performance in terms of filtrate flow by using the slurry velocity as one of the controlling variables.

Example 2

Figure 6:
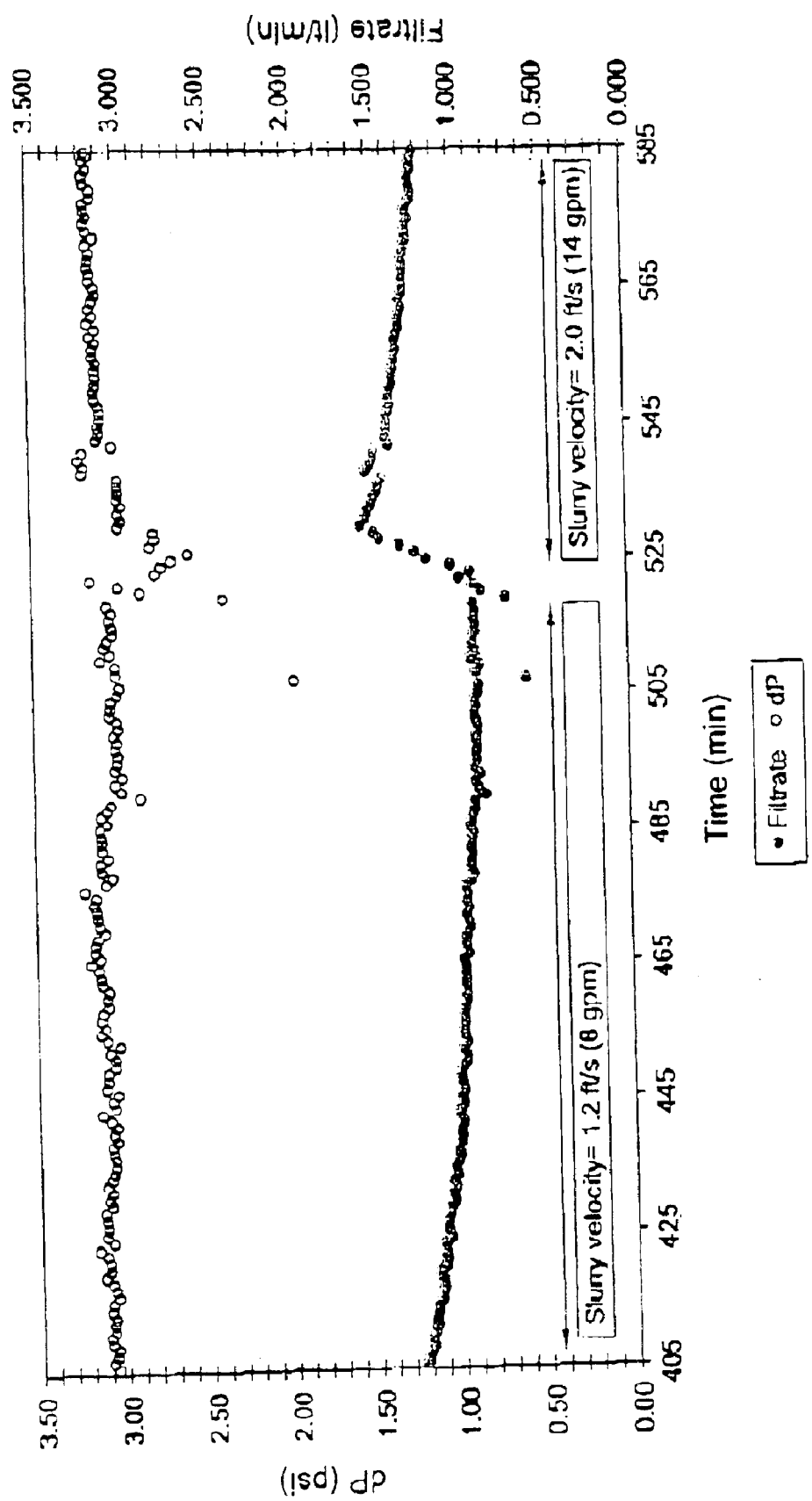
FIG. 6 is a graph representing the effect of slurry velocity on filtrate flow rate at a constant pressure differential of 3 psi between the slurry and the filtrate chambers.

In a similar experiment to Example 1, the slurry flow in the filter housing for this particular example was cycled at two different rates: 8 and 14 gallons per minute (gpm), which is equivalent to a linear velocity in the filter housing of 1.2 and 2.0 ft/s respectively. The pressure differential across the filter medium was kept approximately constant at 3 psi by modifying the filtrate flow rate. Similarly to FIG. 5, FIG. 6 shows the effect of the slurry velocity on the filtrate flow across the filter medium. For instance, in this example, the filtrate flow rate stabilized around 0.8 to 1.2 L/min at a slurry velocity of 1.2 ft/s, and stabilized between 1.2 to 1.5 L/min at a slurry velocity of 2.0 ft/s. Therefore, it can be seen that the filtrate flow rate is dependent on the slurry velocity, which indicates that the cake thickness can be controlled by regulating the linear velocity of the slurry across the cake.

Example 3

A further series of experiments were conducted in the same manner as described in Example 1 using different substrates such as sintered woven wire-mesh (substrates A and B) and sintered powder metal membrane (substrate C), all of different manufactures. The filtrate flow rate (L/min) using a pressure differential of 2 psi and a slurry velocity of 2.8 ft/s (slurry flow rate of 19 gpm) during a 60-minute period for each substrate are reported in Table 1 as well as breakthrough of solid content observed in the filtrate at the onset of cake formation. All three substrates tested exhibited similar overall behavior proving that the filtrate flux in this invention is basically independent of the technology of forming the substrate. The filtrate quality was measured during the experiments showing very good performance. The amount of solids in the filtrate was most of the time below 50 ppm by weight, more typically less than 15 ppm by weight of solid, and often less than 10 ppm by weight, except at the beginning of the filtration cycle when there is no cake yet on the substrate where the filtrate showed solids loadings higher than 50 ppm by weight. Thus, the present invention provides a method to separate solid and liquid using a controlled cake filtration process which can use many different substrates. For example, the preferred embodiments have been tested with different substrates materials, each having a nominal rating of approximately 20 microns. The measured filtrate flow rate and filtrate quality at the onset of cake formation for these different substrates are shown in Table 1.

TABLE 1

| Substrate | Filtrate flow rate at dP = 2 psi, L/min | Range of filtrate solid content at onset of cake formation, ppm by weight |
| --- | --- | --- |
| A | 1.4–1.8 | ca. 70–600 |
| B | 1.3–1.9 | ca. 50–500 |
| C | 1.5–1.9 | ca. 300–4000 |

With time on line, the filtrate flow rate may decrease or the pressure differential across the cake and the filter medium may increase leading to lower filtration fluxes (filtrate flow rate per unit of filter medium surface area measured in $gpm/ft^2$) across the filter medium. This is an indication of changes in the cake characteristics with time. In order to optimize performance, the filtrate flow through the filter element needs to be stopped and the cake needs to be dislodged from the filter medium to start up a new cycle forming a new cake. This method of dislodging the cake is usually known as backwash or blowback. The backwash or blowback can be accomplished by flowing liquid or gas or a combination of both in the reverse direction to the filtrate flow at a given pressure differential across the filter medium.

Another variable not shown in great extent in these examples is the pressure differential across the filter medium comprising the substrate and the filter cake. This variable may allowed to change in a wide range (i.e. from 1 to 30 psi) and together with the slurry velocity it can be used to modify cake characteristics to produce optimum filtration performance yielding high fluxes during longer time, extending the cycle time and improving filtrate quality.

It should be noted that at the beginning of the run shown in FIG. 5 (about the first 45 minutes), the filtrate flow rate decreases from 4 to about 2.4 L/min while the pressure differential increased from 1.2 to about 2.5 psi. This is an indication that a cake is being formed quite rapidly, and as the cake builds up, less filtrate is able to go through the cake. Although not shown, at the very beginning of the run a significant solid content can be present in the filtrate stream. The solid content of about 50 ppm to more than 4000 ppm by weight is typically observed in the first few minutes with various substrates, clearly indicating that without the presence of a cake or with a thin cake layer, solids from the slurry are able to pass through the substrate The embodiments and examples set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A method for operating a filtration system comprising:
   providing a filtration housing comprising a slurry chamber and a filtrate chamber separated by a filter medium, wherein the filter medium comprises a filter cake disposed on a substrate, wherein the filter cake has a thickness and provides a substantial majority of the filtration activity;

passing a slurry, comprising a liquid phase and a solid phase, at a slurry linear velocity through the slurry chamber;

applying a pressure differential between the slurry chamber and the filtrate chamber in order to permeate a portion of the liquid phase of the slurry through the filter medium, wherein the filter medium's filtrate flux is at least partially dependent on the thickness of the filter cake; and regulating the slurry linear velocity to control the thickness of the filter cake.

2. The method according to claim 1 wherein at least a portion of the filter cake comprises particles from the slurry solid phase.

3. The method according to claim 1 wherein the substrate has a nominal rating and a fraction of slurry solid phase comprises particles having a size smaller than the substrate nominal rating.

4. The method according to claim 1 wherein at least 95 weight percent of the particles fall within the range 10–200 um.

5. The method according to claim 1 wherein the slurry solid phase has a number average particle size between 20 and 50 um.

6. The method according to claim 1 wherein the slurry solid phase comprises from 5 to 25 vol % of the slurry.

7. The method according to claim 1 wherein the substrate comprises a medium selected from the group consisting of sintered woven wire-mesh media, sintered powered metal media, porous metal fiber, metal supported membranes, and wedged wire media.

8. The method according to claim 1 wherein the filtrate medium's filtrate flux is independent of substrate morphology.

9. The method according to claim 1 wherein the substrate has a cylindrical body with a longitudinal axis parallel to the direction of the slurry flow through the slurry chamber.

10. The method according to claim 1 wherein the slurry linear velocity is less than 5.0 ft/sec.

11. The method according to claim 1 wherein the slurry linear velocity is between 0.1 and 5.0 ft/sec.

12. The method according to claim 1 wherein the filtration system has a filtration flux of at least 0.2 gal/min/ft$^2$.

13. The method according to claim 1 wherein the liquid phase comprises hydrocarbons produced from Fischer-Tropsch synthesis and the solid phase comprises a catalyst active for Fischer-Tropsch synthesis.

14. The method according to claim 13 wherein the catalyst comprises at least one of cobalt, ruthenium, or iron.

15. The method according to claim 13 wherein the catalyst comprises a support selected from the group consisting of alumina, silica, titania, zirconia, and combinations thereof.

16. The method according to claim 1 wherein the pressure differential between the slurry chamber and the filtrate chamber is less than 30 psi.

17. The method according to claim 1 wherein the slurry linear velocity is regulated by the volumetric flow rate of the slurry through the filtration housing such that the slurry linear velocity increases as the thickness of the filter cake increases and the slurry linear velocity decreases as the thickness of the filter cake decreases.

18. The method of claim 1 wherein the slurry is circulated to and from the filtration system in a circulation loop and the slurry linear velocity is regulated by the configuration of the circulation loop.

19. The method of claim 1 wherein the slurry linear velocity is regulated by the design of the filter housing.

20. The method of claim 1 wherein the slurry is circulated between a Fischer-Tropsch reactor and the filtration system in a circulation loop and the slurry linear velocity is regulated by varying the gas hold up in the Fischer-Tropsch reactor.

21. The method of claim 1 wherein the slurry linear velocity is regulated using valves to control the flow of slurry.

22. The method according to claim 1 wherein the slurry linear velocity is regulated by adding a liquid stream to the slurry passing through the slurry chamber.

23. A method for operating a filtration system comprising:
providing a filtration housing comprising a slurry chamber and a filtrate chamber separated by a substrate;

passing a slurry, comprising a liquid phase and a solid phase, through the slurry chamber at a slurry linear velocity;

applying a pressure differential between the slurry chamber and the filtrate chamber so as to form a filter cake comprising a portion of the slurry solid phase disposed on the substrate;

permeating a portion of the slurry liquid phase through the filter cake and the substrate to generate a filtrate flux, wherein the filter cake acts as a filter such that the filtrate flux is substantially dependent on one or more filter cake properties and independent of the substrate morphology; and regulating the slurry linear velocity through the slurry chamber to control at least one filter cake property.

24. The method according to claim 23 wherein the controlled cake property is cake permeability.

25. The method according to claim 23 wherein the controlled cake property is cake thickness.

26. The method according to claim 23 wherein the substrate has a nominal rating and a fraction of slurry solid phase comprises particles having a size smaller than the substrate nominal rating.

27. The method according to claim 23 wherein at least 95 weight percent of the particles fall within the range 10–200 um.

28. The method according to claim 23 wherein the slurry solid phase has a number average particle size between 20 and 50 um.

29. The method according to claim 23 wherein the solid phase comprises from 5 to 25 vol % of the slurry.

30. The method according to claim 23 wherein the substrate has a cylindrical body with a longitudinal axis parallel to the direction of the slurry flow through the slurry chamber.

31. The method according to claim 23 wherein the slurry linear velocity is less than 5.0 ft/sec.

32. The method according to claim 23 wherein the slurry linear velocity is between 0.1 and 5.0 ft/sec.

33. The method according to claim 23 wherein the filtration system has a filtration flux of at least 0.2 gal/min/ft$^2$.

34. The method according to claim 23 wherein the liquid phase comprises hydrocarbons produced from Fischer-Tropsch synthesis and the solid phase comprises a catalyst active for Fischer-Tropsch synthesis.

35. The method according to claim 34 wherein the catalyst comprises at least one of cobalt, ruthenium, or iron.

36. The method according to claim 34 wherein the catalyst comprises a support selected from the group consisting of alumina, silica, titania, zirconia, and combinations thereof.

37. The method according to claim 23 wherein the pressure differential between the slurry chamber and the filtrate chamber is less than 30 psi.

38. The method according to claim 23 wherein the slurry linear velocity is regulated by the volumetric flow rate of the slurry through the filtration housing such that the slurry linear velocity increases as the thickness of the filter cake increases and the slurry linear velocity decreases as the thickness of the filter cake decreases.

39. The method of claim 23 wherein the slurry is circulated to and from the filtration system in a circulation loop and the slurry linear velocity is regulated by controlling the configuration of the circulation loop.

40. The method of claim 23 wherein the slurry linear velocity is regulated by the design of the filter housing.

41. The method of claim 23 wherein the slurry is circulated between a Fischer-Tropsch reactor and the filtration system in a circulation loop and the slurry linear velocity is regulated by varying the gas hold up in the Fischer-Tropsch reactor.

42. The method of claim 23 wherein the slurry linear velocity is regulated using valves to control the flow of slurry.

43. The method according to claim 23 wherein the slurry linear velocity is regulated by adding a liquid stream to the slurry passing through the slurry chamber.

44. A method for operating a filtration system comprising steps:
  a) providing a filtration housing comprising a slurry chamber, a substrate and a filtrate chamber;
  b) feeding a slurry comprising a liquid phase and a solid phase to the slurry chamber at a slurry linear velocity
  c) applying a differential pressure between the slurry chamber and the filtrate chamber to form a cake disposed on the substrate, wherein the cake at least partially comprises particles from the slurry solid phase disposed on the substrate and wherein the cake provides a substantial majority of the filtration activity;
  d) permeating a portion of the slurry liquid phase through the cake and the substrate to generate a filtrate flux that is substantially independent of the substrate morphology;
  e) intermittently ceasing at least steps c & d in order to remove at least a portion of the cake from the substrate and then resuming c & d.

45. The method according to claim 44 wherein at least a portion of the cake is removed by reversing the filtrate flow across the substrate or passing a gas stream from the filtrate chamber to the slurry chamber.

46. The method according to claim 44 wherein the controlled cake property is cake permeability.

47. The method according to claim 44 wherein the controlled cake property is cake thickness.

48. The method according to claim 44 wherein the substrate has a nominal rating and a fraction of slurry solid phase comprises particles having a size smaller than the substrate nominal rating.

49. The method according to claim 44 wherein at least 95 weight percent of the particles fall within the range 10–200 um.

50. The method according to claim 44 wherein the slurry solid phase has a number average particle size between 20 and 50 um.

51. The method according to claim 44 wherein the solid phase comprises from 5 to 25 vol % of the slurry.

52. The method according to claim 44 wherein the substrate has a cylindrical body with a longitudinal axis parallel to the direction of the slurry flow through the slurry chamber.

53. The method according to claim 44 wherein the slurry linear velocity is less than 5.0 ft/sec.

54. The method according to claim 44 wherein the slurry linear velocity is between 0.1 and 5.0 ft/sec.

55. The method according to claim 44 wherein the filtration system has a filtration flux of at least 0.2 gal/min/ft$^2$.

56. The method according to claim 44 wherein the liquid phase comprises hydrocarbons produced from Fischer-Tropsch synthesis and the solid phase comprises a catalyst active for Fischer-Tropsch synthesis.

57. The method according to claim 56 wherein the catalyst comprises at least one of cobalt, ruthenium, or iron.

58. The method according to claim 56 wherein the catalyst comprises a support selected from the group consisting of alumina, silica, titania, zirconia, and combinations thereof.

59. The method according to claim 44 wherein the pressure differential between the slurry chamber and the filtrate chamber is less than 30 psi.

60. The method according to claim 44 wherein the slurry linear velocity is regulated by the volumetric flow rate of the slurry through the filtration housing such that the slurry linear velocity increases as the thickness of the filter cake increases and the slurry linear velocity decreases as the thickness of the filter cake decreases.

61. The method of claim 44 wherein the slurry is circulated to and from the filtration system in a circulation loop and the slurry linear velocity is regulated by controlling the configuration of the circulation loop.

62. The method of claim 44 wherein the slurry linear velocity is regulated by the design of the filter housing.

63. The method of claim 44 wherein the slurry is circulated between a Fischer-Tropsch reactor and the filtration system in a circulation loop and the slurry linear velocity is regulated by varying the gas hold up in the Fischer-Tropsch reactor.

64. The method of claim 44 wherein the slurry linear velocity is regulated using valves to control the flow of slurry.

65. The method according to claim 44 wherein the slurry linear velocity is regulated by adding a liquid stream to the slurry passing through the slurry chamber.

* * * * *